(12) United States Patent
Bicego et al.

(10) Patent No.: US 7,689,423 B2
(45) Date of Patent: Mar. 30, 2010

(54) SYSTEM AND METHOD OF PROVIDING TELEMATICALLY USER-OPTIMIZED CONFIGURABLE AUDIO

(75) Inventors: James E. Bicego, Lake Orion, MI (US); Anthony J. Sumcad, Southfield, MI (US); Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 915 days.

(21) Appl. No.: 11/105,076

(22) Filed: Apr. 13, 2005

(65) Prior Publication Data

US 2006/0235688 A1 Oct. 19, 2006

(51) Int. Cl.
*G10L 21/00* (2006.01)
*G10L 15/00* (2006.01)
*G10L 13/00* (2006.01)

(52) U.S. Cl. ............... 704/270; 704/231; 704/258; 704/272

(58) Field of Classification Search ............ 704/210, 704/215, 253, 254, 256, 260, 274, 275, 231, 704/235, 258
See application file for complete search history.

(56) References Cited

U.S. PATENT DOCUMENTS

| | | | | |
|---|---|---|---|---|
| 4,870,686 | A * | 9/1989 | Gerson et al. | 704/234 |
| 6,308,154 | B1 * | 10/2001 | Williams et al. | 704/254 |
| 6,470,315 | B1 * | 10/2002 | Netsch et al. | 704/256.5 |
| 6,839,670 | B1 * | 1/2005 | Stammler et al. | 704/251 |
| 7,031,924 | B2 * | 4/2006 | Kimura et al. | 704/274 |
| 2002/0042709 | A1 * | 4/2002 | Klisch et al. | 704/231 |
| 2003/0023439 | A1 * | 1/2003 | Ciurpita et al. | 704/246 |
| 2003/0055653 | A1 * | 3/2003 | Ishii et al. | 704/275 |
| 2003/0168844 | A1 | 9/2003 | Borroni-Bird et al. | |
| 2003/0185162 | A1 | 10/2003 | Fraser et al. | |
| 2003/0232619 | A1 | 12/2003 | Fraser | |
| 2004/0073423 | A1 * | 4/2004 | Freedman | 704/235 |
| 2005/0137860 | A1 * | 6/2005 | Nam | 704/205 |
| 2006/0047373 | A1 | 3/2006 | Sumcad et al. | |

OTHER PUBLICATIONS

U.S. Appl. No. 10/212,957, filed Aug. 6, 2002, Fraser et al.
U.S. Appl. No. 10/837,935, filed May 3, 2004, Oesterling et al.

* cited by examiner

*Primary Examiner*—Richemond Dorvil
*Assistant Examiner*—Douglas C Godbold
(74) *Attorney, Agent, or Firm*—Dierker & Associates, P.C.

(57) ABSTRACT

A method of repeating a computer recognized string in a telematics unit in a vehicle, including receiving a user utterance at the telematics unit from a user, the user utterance including a plurality of words and a plurality of user pauses between the words, parsing the user utterance into a plurality of phonemes, forming a data string in which each user pause is associated with a phoneme adjacent to the user pause, and playing back the data string.

20 Claims, 8 Drawing Sheets

300

| Recognize phonemes for the plurality of words corresponding to the user utterance at the speech recognition engine in the TU | S302 |

306

320

334

SYSTEM AND METHOD OF PROVIDING TELEMATICALLY USER-OPTIMIZED CONFIGURABLE AUDIO

FIELD OF THE INVENTION

This invention relates generally to replaying phrases spoken by a user at a telematics unit. In particular, the invention relates to replaying phrases spoken by a user with a tempo and volume.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

For example, a user can initiate a phone call from an in-vehicle mobile phone by announcing a call command. A call command can include the name or phone number of the person to be called. The telematics unit will repeat the phone number being called just before the call is initiated. The repeated phone number is generated by a speech-generation algorithm that provides audio signals for the string of numbers at a preset volume, without inflection and with a measured equal pause between each number. The acoustic waves generated by audio signal at a speaker have frequencies within the full range of frequencies heard by a human with average hearing.

In some cases, users may be prompted to enter information through a voice interface. The virtual utterances are synthetically generated at a preset volume, without inflection, with a measured equal pause between each word, and cover the full range of frequencies heard by a human with average hearing.

Typically, people say a phone number with a pattern of varying pauses between different numbers. For example, a person may say the number 555-222-3333 with short pauses between the fives (5's), a long pause between the final 5 and the first 2, short pauses between the twos (2's), a long pause between the last 2 and the first 3, and finally with short pauses between the threes (3's). This sequence of pauses and numbers can be illustrated as the following string in which each under-score represents a small pause and four under-scores in a sequence combine to form a long pause: 5_5_5_ _ _ _2_2_2_ _ _ _3_3_3_3. Some people have difficulty recognizing or remembering a number if the number is spoken in an unfamiliar pattern or if the pattern takes too long to announce.

If a person is in an MVCU with noisy background conditions, for example, if the window is open and trucks are passing at high speeds, then the person announcing a voice command to the telematics unit speaks loudly to ensure that the microphone in the vehicle picks up their voice command over the background noise. The telematics unit announces a virtual utterance responsive to the voice command, but the response may not be audible to the person in the vehicle because of the background noise.

Additionally, if the user of the telematics unit does not hear a portion of the frequency range that is normally heard by humans, then synthetically generated responses from the telematics unit can be difficult for the user to hear. For example, if a user is not able to hear acoustic waves at frequencies above a frequency, F1, and if forty percent (40%) of the acoustic waves produced by synthetically generated prompts in a telematics unit include frequencies above the frequency, F1, the ear of the user will only respond to sixty percent (60%) of the acoustic waves produced by synthetically generated prompt.

It is desirable to provide a method and system to synthetically generate prompts in a telematics unit, which mimic the pattern of a users speech. It is further desirable to provide a method and system to provide synthetically generated prompts in a telematics unit that match the volume level of the command that generated the prompt. It is further desirable to provide a method and system to synthetically generate prompts in a telematics unit that only produce acoustic waves having frequencies in the ranges of frequencies that are audible to the user of the telematics unit.

SUMMARY OF THE INVENTION

One aspect of the present invention provides a method of repeating a computer recognized string in a telematics unit in a vehicle, including receiving a user utterance at the telematics unit from a user, the user utterance including a plurality of words and a plurality of user pauses between the words, parsing the user utterance into a plurality of phonemes, forming a data string in which each user pause is associated with a phoneme adjacent to the user pause, and playing back the data string.

A second aspect of the present invention provides computer readable medium storing a computer program including computer readable code for receiving a user utterance at the telematics unit from a user, the user utterance including a plurality of words and a plurality of user pauses between the words, computer readable code for parsing the user utterance into a plurality of phonemes, computer readable code for forming a data string in which each user pause is associated with a phoneme adjacent to the user pause and computer readable code for playing back the data string.

A third aspect of the present invention provides a system for repeating a computer recognized string in a telematics unit in a vehicle including means for receiving a user utterance from a user, means for parsing the user utterance into a plurality of phonemes, means for forming a data string in which each user pause is associated with a phoneme adjacent to the user pause, and means for playing back the data string.

The foregoing and other features and advantages of the invention will become further apparent from the following detailed description of the presently preferred embodiment, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
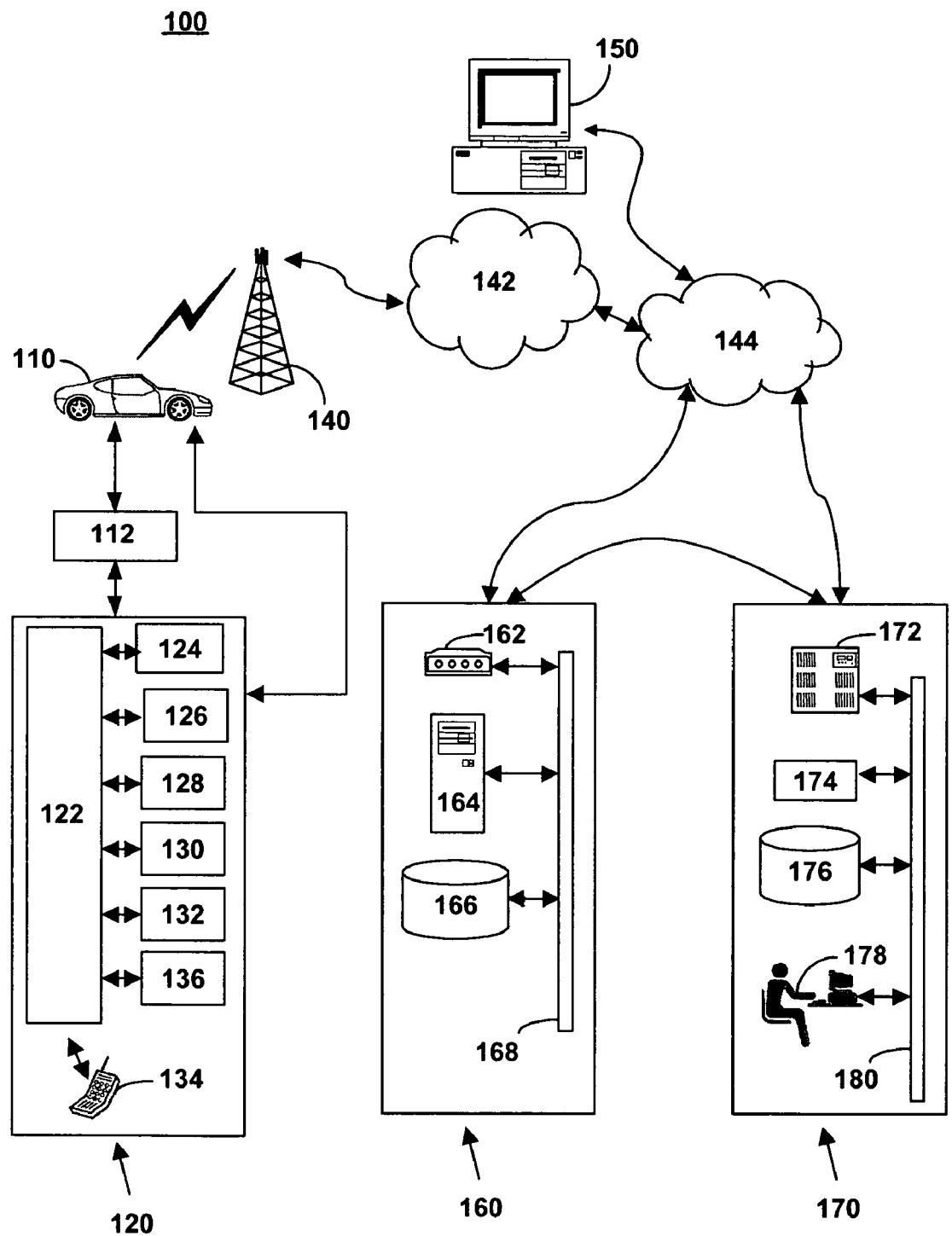
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, an embedded or in-vehicle portable communication device 134, such as, mobile phone or a personal digital assistant and a display 136. In one embodiment, the display 136 is not part of the telematics unit 120 but is part of the MVCU 110 and interfaces with the telematics unit 120 via the vehicle communication network 112.

In another embodiment, the display 136 is part of the embedded or in-vehicle portable communication device 134. In one embodiment, the embedded or in-vehicle portable communication device 134 includes short-range wireless receivers and transmitters. The short-range wireless receivers and transmitters can be Wi-Fi and/or Bluetooth devices as is known in the art. In this embodiment, telematics unit 120 includes short-range wireless receiver chips that are compatible with the Wi-Fi and/or Bluetooth technologies. As used herein, the term "wi-fi" includes any radio transmission configured to broadcast within a limited range, such as less than one mile, and includes transmissions made under an industry standard, such as FCC part 13. "Wi-fi" includes, but is not limited to, 802.11 transmissions.

In other embodiments, telematics unit 120 may be implemented without one or more of the above listed components. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown).

Processor 122 executes various computer programs that control programming and operational modes of electronic and mechanical systems within MVCU 110. Processor 122 controls communications (e.g. call signals) between telematics unit 120, wireless carrier system 140, and call center 170. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

A voice-recognition application including one or more speech recognition engines is installed in processor 122. Speech recognition engines translate human voice input through microphone 130 to digital signals. The one or more speech recognition engines installed in processor 122 include one or more speech generation algorithms. The speech generation algorithms translate digital signals into virtual utterances, which are sent from processor 122 out through one or more speakers 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and/or land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one embodiment, communication services manager 174 includes at least one analog and/or digital modem. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 through wireless carrier system 140, communication network 142, land network 144, voice and data switch 172, and/or network system 180. Communication services manager 174 stores or retrieves data and information from communication services database 176. Communication services manager 174 may provide requested information to communication services advisor 178. In one embodiment, communication services manager 174 contains at least one analog and/or digital modem.

In one embodiment, communication services advisor 178 is implemented as a real advisor. In an example, a real advisor is a human being in verbal communication with a user or subscriber (e.g. a client) in MVCU 110 via telematics unit

120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 through wireless carrier system 140, communication network 142, and land network 144 using voice transmissions, or through communication services manager 174 and switch 172 using data transmissions. Switch 172 selects between voice transmissions and data transmissions.

Figure 2:
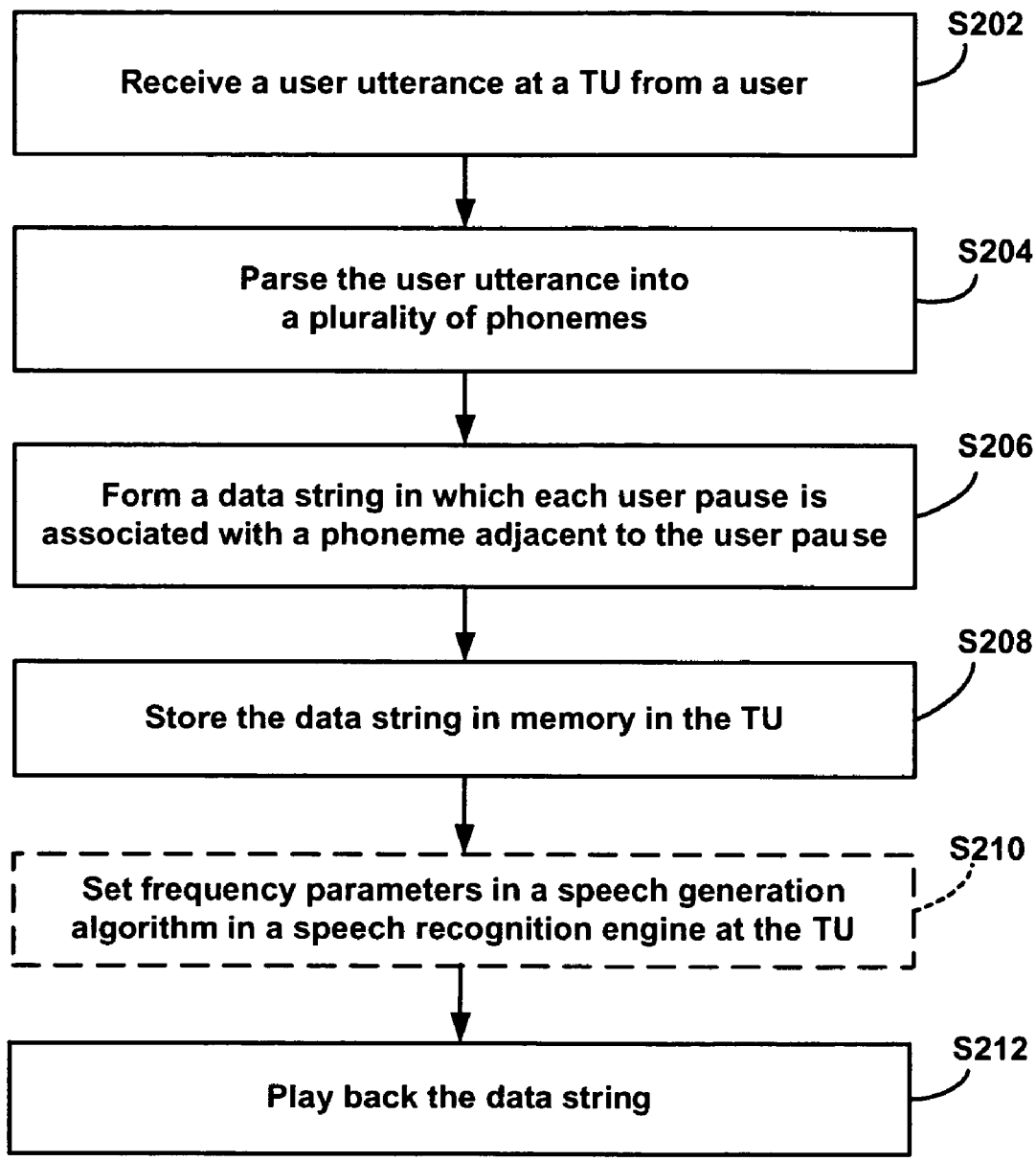
FIG. 2 illustrates a method for repeating a computer recognized string in a telematics unit in accordance with the present invention.

FIG. 2 illustrates a method 200 for repeating a computer recognized string in a telematics unit 120 in accordance with the present invention. The telematics unit 120, the processor 122, the in-vehicle memory 128, and the one or more speakers 132 have stored in computer readable medium at least one computer program including computer readable code to perform the operations described with reference to method 200.

During stage S202, the telematics unit (TU) 120 receives a user utterance from a user. The spoken phrase includes a plurality of words and a plurality of user pauses between the words. In one embodiment, the telematics unit (TU) 120 receives a user utterance at a speech recognition engine operating in continuous recognition mode. In one embodiment, the speech recognition engine is executed by processor 122. In another embodiment, the user utterance includes a phone number. In an exemplary case, the user speaks a name of a person and the person's phone number in sequence.

During stage S204, the telematics unit 120 parses the user utterance into a plurality of phonemes. One embodiment of a method for parsing the user utterance into a plurality of phonemes is described below with reference to method 300 in FIG. 3.

During stage S206, the telematics unit 120 forms a data string in which each user pause is associated with a phoneme adjacent to the user pause. In one embodiment, the phoneme adjacent to the user pause is one of a phoneme immediately preceding the user pause and a phoneme immediately following the user pause. One embodiment of a method for forming a data string is described below with reference to method 400 in FIG. 4.

During stage S208, the telematics unit (TU) 120 stores the data strings in the in-vehicle memory 128. In the exemplary case in which the name of a person and their phone number were spoken in sequence at the telematics unit 120, the telematics unit 120 stores the data strings corresponding to the name of a person and their phone number as correlated data strings in the in-vehicle memory 128. In one embodiment, stage S208 is omitted and the flow proceeds directly from stage S206 to stage S212.

Stage S210 is optional. During stage S210, the telematics unit 120 sets frequency parameters in a speech generation algorithm in a speech recognition engine. This option of this method is available to users who have difficulty hearing one or more range of frequencies. If this option is selected, then during stage S212, the data string is played back to the user in a voice prompt or virtual utterance having acoustic waves all within the range of frequencies that the user can hear. Two embodiments of methods for setting frequency parameters in a speech generation algorithm in a speech recognition engine are described below in a first and a second embodiment with reference to method 700 in FIG. 7 and method 800 in FIG. 8, respectively.

During stage S212, the telematics unit 120 plays back the data string. In one embodiment, a speech generation algorithm in the speech recognition engine operates on the data string to generate the audio signals of a virtual utterance from the telematics unit 120. The speech recognition engine converts the digital signal into the phonemes and pauses. The phonemes and pauses are sent from processor 122 out through one or more speakers 132 as acoustic waves of the virtual utterance. Acoustic waves are heard by the user as the virtual utterance including a plurality of words and a plurality of user pauses between the words. Thus, the virtual utterance mimics the patterns established by the rhythm and timing of the user utterance so the user utterance is repeated to the user as a virtual utterance in a more natural progression used by humans.

In the embodiment in which stage S208 is omitted, the one or more speech generation algorithms in the speech recognition engine translate the phonemes and the associated user pauses in the received data string into a signal representative of the words and pauses between words, which is repeated back to the user as a virtual utterance upon receipt of the user utterance. Additional details about how the telematics unit 120 plays back the data string are described below in a first and a second embodiment with reference to method 500 in FIG. 5 and method 600 in FIG. 6, respectively.

Figures 3, 3A:
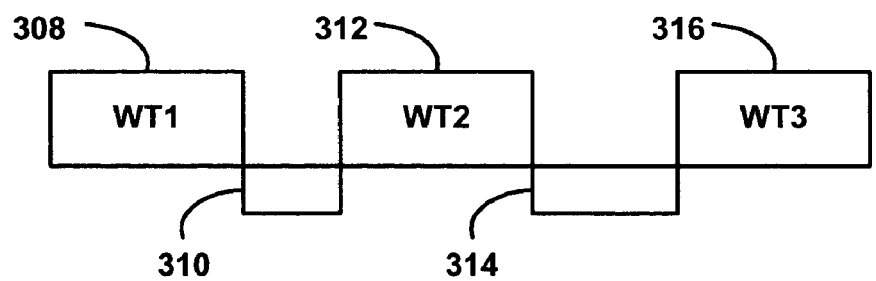
FIG. 3 illustrates a method for parsing a user utterance into a plurality of phonemes in accordance with the present invention.
FIGS. 3a-3c illustrate the duration of phrases and pauses in an exemplary ten digit phone number.

FIG. 3 illustrates one embodiment of a method 300 for parsing a user utterance into a plurality of phonemes in accordance with the present invention. The user utterance includes the plurality of words and plurality of pauses between the words. The telematics unit 120, the processor 122, the in-vehicle memory 128, and the one or more speakers 132 have stored in computer readable medium at least one computer program including computer readable code to perform the operations described with reference to method 300.

During stage S302, the telematics unit (TU) 120 recognizes phonemes for the plurality of words corresponding to the user utterance at the speech recognition engine. The one or more speech recognition engines, for example, installed in processor 122 receive the words as well as the pauses between the words, apply algorithms to parse the words into phonemes and, apply algorithms to recognize the parsed phonemes. The recognized phonemes are converted into digital signals correlated to the phoneme. In one embodiment, the phonemes are converted into digital signals correlated to the phoneme from a phoneme look-up table in the in-vehicle memory 128.

The digital signal format of the converted phoneme depends on the coding scheme of the speech recognition engine. In one embodiment, the data string is a series of 1's and 0's. In another embodiment, the data string is a series of +1's, 0's and −1's. Other embodiments employ any data string coding formats known in the art.

Figure 3B:
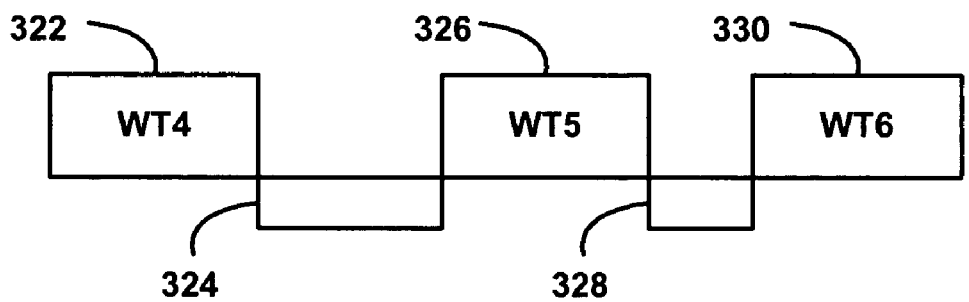
Figure 3C:
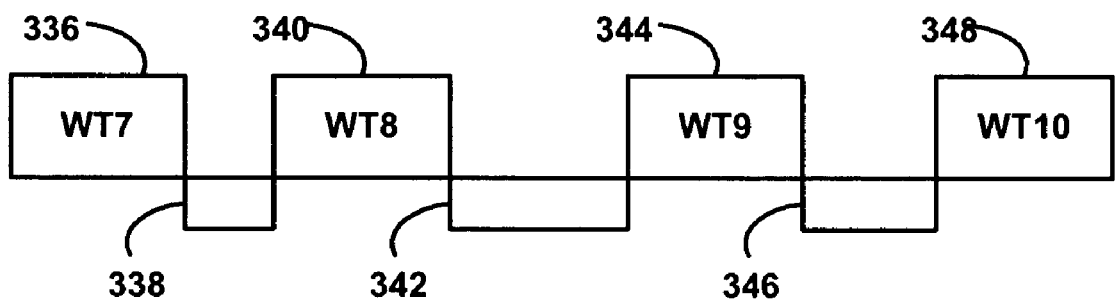

FIGS. 3*a*, 3*b*, and 3*c* illustrate signal patterns 306, 320, and 324, respectively, which indicate the duration of phrases and pauses in an exemplary ten-digit phone number. The horizontal axis in these figures is time and the vertical axis represents the amplitude of the spoken phrases. Pauses are shown as below the horizontal axis.

Signal pattern 306 in FIG. 3*a* represents the spoken phrases and pauses included in a first set of three digits in a ten digit number. The first set of three digits is correlated to the area code of the phone number. The extent of segment 308 along the horizontal axis represents the time taken to say the first digit of the ten digit number as word time 1 (WT1). The extent of segment 312 along the horizontal axis represents the time taken to say the second digit of the ten digit number as word time 2 (WT2). The extent of segment 316 along the horizontal axis represents the time taken to say the third digit of the ten digit number as word time 3 (WT3). The extent of segment 310 along the horizontal axis represents the duration of the pause between the first digit and the second digit. The extent of segment 314 along the horizontal axis represents the duration of the pause between the second digit and the third digit. In this exemplary phrase, the duration of segment 314 is longer than the duration of segment 310.

In like manner, signal pattern 320 in FIG. 3b represents the spoken phrases and pauses included in a second set of three digits in the ten digit number. The second set of three digits is correlated to the local code of the phone number. The extent of segment 322 along the horizontal axis represents the time taken to say the fourth digit of the ten digit number as word time 4 (WT4). The extent of segment 326 along the horizontal axis represents the time taken to say the fifth digit of the ten digit number as word time 5 (WT5). The extent of segment 330 along the horizontal axis represents the time taken to say the sixth digit of the ten digit number as word time 6 (WT6). Segment 324 represents the duration of the pause between the fourth digit and the fifth digit. Segment 328 represents the duration of the pause between the fifth digit and the sixth digit. In this exemplary phrase, the duration of segment 324 is longer than the duration of segment 328.

FIG. 3c represents the spoken phrases and pauses included in the set of four digits in the ten digit number. The four digits correlate to the last four digits of the phone number, which uniquely identify a phone number. The extent of segment 336 along the horizontal axis represents the time taken to say the seventh digit of the ten digit number as word time 7 (WT7). The extent of segment 340 along the horizontal axis represents the time taken to say the eighth digit of the ten digit number as word time 8 (WT8). The extent of segment 344 along the horizontal axis represents the time taken to say the ninth digit of the ten digit number as word time 9 (WT9). The extent of segment 348 along the horizontal axis represents the time taken to say the tenth digit of the ten digit number as word time 10 (WT10). Segment 338 represents the duration of the pause between the seventh digit and the eighth digit. Segment 342 represents the duration of the pause between the eighth digit and the ninth digit. Segment 346 represents the duration of the pause between the ninth digit and the tenth digit. In this exemplary phrase, the duration of segment 342 is longer than the duration of segment 346 and segment 338 and the duration of segment 346 is longer than the duration of segment 338.

Figure 4:
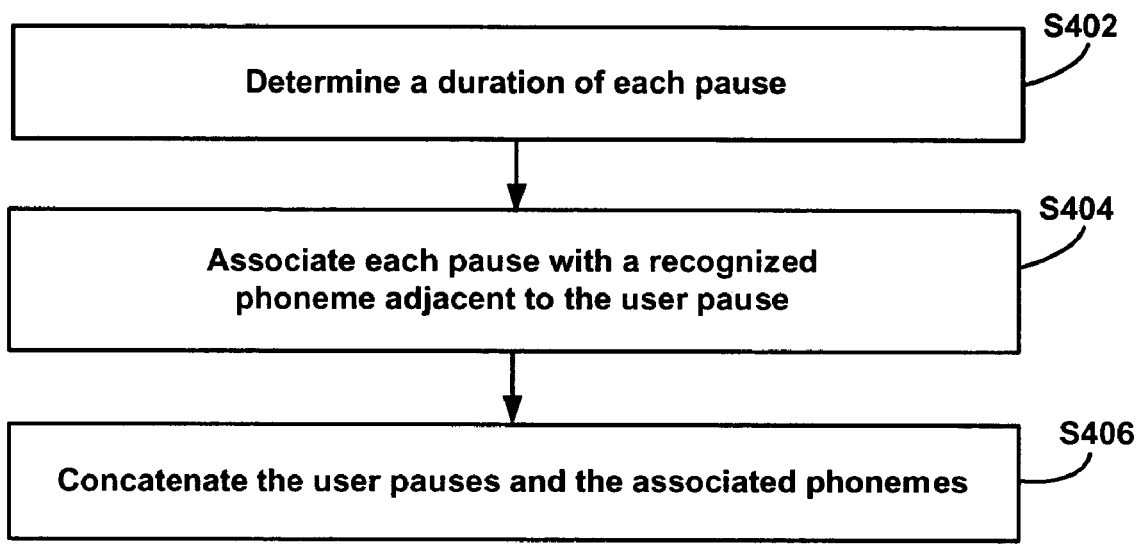
FIG. 4 illustrates a method for forming a data string in accordance with the present invention.

FIG. 4 illustrates a first embodiment of a method 400 for forming a data string in accordance with the present invention. The telematics unit 120, the processor 122, the in-vehicle memory 128, and the one or more speakers 132 have stored in a computer readable medium at least one computer program including computer readable code to perform the operations described with reference to method 400.

During stage S402, the telematics unit 120 determines the duration of each pause. Each pause is converted into a digital signal, which is correlated to the duration of the pause. In one embodiment, a clock (not shown) in the processor 122 is set to zero when the user utterance begins. In another embodiment, a time stamp from a GPS unit, such as GPS Unit 126 provides timing information. The processor 122 obtains the time on the clock when the user utterance ends, calculates the time duration of the user utterance and stores the calculated time duration of the user utterance in the in-vehicle memory 128. In this manner, the processor 122 in the telematics unit 120 determines the duration of the user utterance.

In one embodiment the duration of time for each pause is a measured time. In another embodiment, the duration of time for each pause is a calculated average of time. In yet another embodiment, the duration of time for each pause is a plurality of time-units. In one embodiment, the time-units are one-tenth ($1/10$) of a second. In another embodiment, the time-units are one-hundredth ($1/100$) of a second.

In one embodiment to determine an average duration of each pause, an algorithm in the processor 122 measures the duration of the user utterance, calculates the number of words based on the phonemes recognized during stage S302 described above with reference to method 300 of FIG. 3, and divides the number of words into the measured time duration of the user utterance to determine the duration of each pause as an average time for each pause. For example, if the user speaks N digits for a phone number with pauses between each spoken digit and the processor 122 clocks the duration of the user utterance as a time T, the processor 122 determines N words were spoken, the processor 122 determines the speech time, ST1, for the combined N words without pauses, and then determines an average pause duration of (T−ST1)/N for each pause. In this embodiment the duration of the pauses reflects the speed with which the user announced the user utterance.

In another embodiment, in order to determine an average duration of pauses between N words spoken by the user, the processor 122 clocks the duration of the user utterance as a time T, the processor determines N words were spoken, the processor 122 determines the speech time, ST1, for the combined N words without pauses, and then determines an average pause duration of (T−ST1)/(N−1) for each pause. In this embodiment the duration of the pauses reflects the speed with which the user announced the user utterance.

In yet another embodiment to determine an average duration of each pause, an algorithm in the processor 122 determines that the user utterance is a phone number of ten digits based on the phonemes recognized during stage S302 described above with reference to method 300 of FIG. 3. In this case, the processor 122 sequentially segments the user utterance into a first set of three digits, a second set of three digits and a set of four digits, which correlate to the area code numbers, the local code numbers and the last four digits of the ten digit phone number, respectively.

The clock (not shown) in the processor 122 is set to zero when the user utterance begins and the time on the clock as the user utterance is received is periodically stored with a correlated currently received pause or phoneme in received-time look-up table in the in-vehicle memory 128. The period with which the user utterance is stored is small enough to include at least one time notation for each phoneme and each pause.

In this embodiment, when the phone number has ten digits, as modeled above with reference to FIGS. 3a-3b, the processor 122 determines the following from the received-time look-up table: the time duration for the first set of three digits, T1, which correlate to summing segments 308, 310, 312, 314, and 316 in FIG. 3a; the time duration for the second set of three digits, T2, which correlated to summing segments 322, 324, 326, 328, and 330 in FIG. 3b; the time duration for the last four digits of the phone number, T3, which correlated to summing segments 336, 338, 340, 342, 344, 346, and 348 in FIG. 3c; and the total duration T4 for all the ten digits and pauses; and the total word-time duration, WT1, WT2, WT3, WT4, WT5, WT6, WT7, WT8, WT9 and WT10, for the respective ten digits. Then, the processor 122 calculates the average time duration P1 for the pauses between the first set of three digits as (T1−WT1−WT2−WT3)/2=P1. As modeled in the exemplary spoken phrase of FIG. 3a, the asymmetric pause segment 310 and segment 314 are averaged as P1.

The processor 122 also calculates the average time duration P2 for the pauses between the second set of three digits as (T2−WT4−WT5−WT6)/2=P2. As modeled in the exemplary spoken phrase of FIG. 3b, the asymmetric pause segment 324 and segment 328 are averaged as P2.

The processor 122 also calculates the average time duration P3 for the pauses between the set of four digits as (T3−WT7−WT8−WT9−WT10)/3=P3. As modeled in the exemplary spoken phrase of FIG. 3c, the three asymmetric pause segments 338, 342 and 346 are averaged as P3. The processor 122 also calculates the sum (2×P1)+(2×P2)+(3×P3), which is the total of pauses within the segments the user utterance. The processor 122 retrieves the time duration of the user utterance from the in-vehicle memory 128. Then, the processor 122 calculates an average pause P4 between the first set of three digits and the second set of three digits and between the second set of three digits and the set of four digits. As modeled in the exemplary spoken phrases of FIGS. 3a, 3b, and 3c, a first pause P4 is located between WT3 and WT4 and a second pause P4 is located between WT6 and WT7. In other embodiments, other calculations are performed to determine the duration of the pauses.

The processor 122 stores the average time durations P1, P2, P3, and P4 of the pauses as well as the clock based time durations T1, T2, T3, and T4 of the sets of numbers in an in-vehicle memory 128.

In yet another embodiment to determine an average duration of each pause, an algorithm in the processor 122 determines that the user utterance is a phone number of seven digits based on the phonemes recognized during stage S302 described above with reference to method 300 of FIG. 3. In this case, the processor 122 sequentially segments the user utterance into a set of three digits and a set of four digits, which correlate to the local code number and the last four digits of the seven digit phone number, respectively. The processor 122 then determines the average time durations of the pauses between the set of three digits, the average time durations of the pauses between the set of four digits, the time of input for the seven digits in phone number and the pause between the set of three digits and the set of four digits in the manner similar to that described above for the ten digit phone number.

In an embodiment to measure the duration of each pause, the clock in the processor 122 tracks the beginning time and end time of each word and each pause. In this embodiment, the processor 122 calculates the time duration for each pause based on the difference between the beginning time and end time of each pause and stores the time duration of a pause with the correlated pause in a measured-pause-look up table in the in-vehicle memory 128. In this embodiment, the duration of the word time segments 308, 312, 316, 322, 326, 330, 336, 340, 344, and 348 in the exemplary ten digit number represented in FIGS. 3a, 3b and 3c are each stored in the look up table. The duration of pause segments 310, 314, 324, 328, 338, 342, and 346 in the exemplary ten digit number represented in FIGS. 3a, 3b and 3c are each stored in the look up table along with the duration of the pause between word time segment 316 and segment 322 and the duration of the pause between word time segment 330 and segment 336.

In another embodiment, the user utterance is a seven-digit phone number that is announced with less than seven numbers. For example the number 211-2000 can be announced as "Two, eleven, two-thousand," as "Twenty-one, one, twenty, zero, zero" or as "Two, one, one, two-thousand." The user may or may not have included a pause within the phrase "two-thousand." In this embodiment, the processor 122 can determine the duration of each pause using an average pause length or a measured pause length as described above. The processor 122 recognizes that the user utterance correlates to the seven-digit number of 2, 1, 1, 2, 0, 0, 0, 0.

During stage S404, each pause is associated with a recognized phoneme adjacent to the user pause. In one embodiment, the phoneme adjacent to the user pause is the phoneme immediately preceding the user pause. In the exemplary signal pattern 306 described above with reference to FIG. 3a, segment 310 is associated with the segment 308, which represents a first phoneme for a first digit and while segment 314 is associated with segment 312, which represents a second phoneme for a second digit.

In another embodiment, the phoneme adjacent to the user pause is the phoneme immediately following the user pause. In this case the exemplary signal pattern 306 described above with reference to FIG. 3a, segment 310 is associated with the segment 312, which represents a second phoneme for the second digit and segment 314 is associated with segment 316, which represents a third phoneme for a third digit. The pauses are assigned a time duration equal to the time duration determined during stage S402.

During stage S406, the processor 122 in the telematics unit 120 concatenates the user pauses each having an assigned time duration and the associated adjacent phonemes to form the data string. The data string is a digital data string. In order to illustrate this concatenation, the data string is represented, herein, as a list of numbers with one or more markers between each number. Each type of marker represents a pause having a duration of unit time.

For example, if an asterisk marker "*" represents an average pause duration of (T−ST1)/N according to the first embodiment described with reference to stage S404, then concatenated data string for the phone number 555-222-3333 is represented as 5*5*5*2*2*2*3*3*3*3. In the embodiment in which the number 211-2000 was announced as "Two, eleven, two-thousand," the concatenated data string for the phone number 211-2000 is represented as 2*11*2000. In the embodiment in which the number 211-2000 was announced as "Twenty-one, one, twenty, zero, zero," the concatenated data string for the phone number 211-2000 is represented as 21*1*20*0*0.

If a plus marker "+" represents an average pause duration of (T−ST1)/(N−1) according to another embodiment described with reference to stage S404, then concatenated data string for the phone number 555-222-3333 is represented as 5+5+5+2+2+2+3+3+3+3.

According to yet another embodiment described with reference to stage S404, marker [p1] represents the average time duration P1 for the pauses between the first set of three digits, marker [p2] represents the average time duration P2 for the pauses between the second set of three digits, marker [p3] represents the average time duration P3 for the pauses between the set of four digits and marker [p4] represents average pause P4 between the first set of three digits and the second set of three digits and between the second set of three digits and the set of four digits. In the exemplary signal pattern 306 described above with reference to FIG. 3a, average time duration P1 is the average time duration of segment 310 and segment 314. In the exemplary signal pattern 320 described above with reference to FIG. 3b, average time duration P2 is the average time duration of segment 324 and segment 328. In the exemplary signal pattern 334 described above with reference to FIG. 3c, average time duration P3 is the average time duration of segment 338, segment 342, and segment 346.

In this case the concatenated data string for the phone number 555-666-7777 is represented as 5[p1]5[p1]5[p4]6 [p2]6[p2]6[p4]7[p3]7[p3]7[p3]7. In the embodiment in which the number 211-2000 was announced as "Two, eleven, two-thousand," or "Twenty-one, one, twenty, zero, zero," there is not a set of three numbers and a set of four numbers on which the algorithm can operate.

According to yet another embodiment described with reference to stage S404 in which the processor 122 calculates the time duration for each pause, an under-score marker _ represents a pause having the duration of time-unit T. N number of under-scores in an uninterrupted sequence represent a pause having the duration of N×T. If during stage S202 the user stated the phone number 555-222-333 as the user utterance 5_5_5_ _ _ _ _2_2_2_ _ _ _ _3_3_3_3, then the concatenated data string is represented as 5_5_5_ _ _ _ _2_2_ 2_ _ ₃_ _ _ _3_3_3. In the embodiment in which the number 211-2000 was announced stated as 2_, _ _ , 2000, the concatenated data string for the phone number 211-2000 is represented as 2_11_ _ _2000. In the embodiment in which the number 211-2000 was stated as 21_1_ _ _ _20_ _0_0, the concatenated data string for the phone number 211-2000 is represented as 21_1_ _ _ _20_ _0_0.

Figure 5:
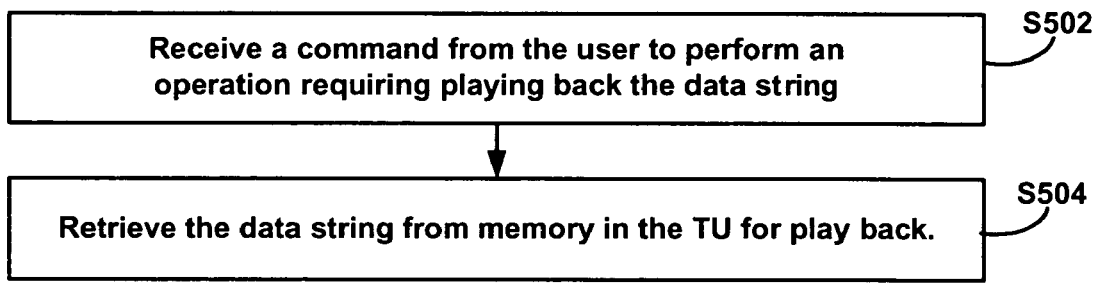
FIG. 5 illustrates a first embodiment of a method for playing back the data string in accordance with the present invention.

FIG. 5 illustrates a first embodiment of a method 500 for playing back the data string in accordance with the present invention. The telematics unit 120, the processor 122, the in-vehicle memory 128, and the one or more speakers 132 have stored in computer readable medium at least one computer program including computer readable code to perform the operations described with reference to method 500.

During stage S502, the telematics unit 120 receives a command from the user to perform an operation requiring playing back the data string that was stored in the in-vehicle memory 128 during stage S208. An exemplary command requiring a play back of a data string is when the user provides the command "Call John," the telematics unit 120 retrieves the phone number correlated to "John" and provides a virtual utterance to the user. The virtual utterance is the phone number "555-222-3333," which is announced prior to establishing the wireless connection with 555-222-3333. The virtual utterance allows the user to confirm the phone number. In one embodiment, the virtual utterance is a voice prompt, which announces "Calling John at 5, 5, 5, 2, 2, 2, 3, 3, 3, 3." If the virtual utterance includes the phone number 211-2000, then the virtual utterance to allow the user to confirm the phone number may announce "Calling John at 21, 1, 20, 0, 0."

During stage S504, the telematics unit 120 retrieves the data string from the in-vehicle memory 128 for playback. The speech recognition engine recognizes the command and generates an instruction to retrieve the data string from the in-vehicle memory 128. In one embodiment, the retrieve instruction directs the processor 120 to a look-up table that correlates the recognized command with the storage address in the in-vehicle memory 128. Responsive to the retrieve instruction, the processor 122 retrieves the data string in digital format from the in-vehicle memory 128. The data string is then played back according to the method described in stage S212 with reference to method 200 in FIG. 2.

Figure 6:
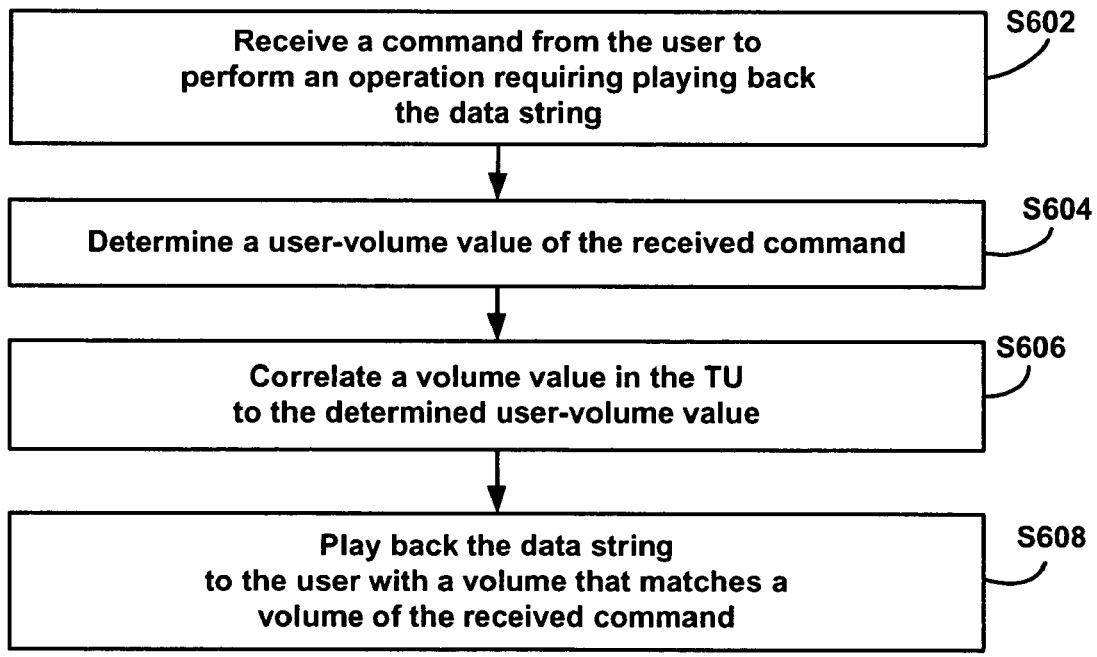
FIG. 6 illustrates a second embodiment of a method for playing back the data string in accordance with the present invention.

FIG. 6 illustrates a second embodiment of a method 600 for playing back the data string corresponding to the spoken phrase in accordance with the present invention. In this embodiment, the spoken phrase is played back to the user at a volume that matches the volume of the command received from the user. The telematics unit 120, the processor 122, the in-vehicle memory 128, and the one or more speakers 132 have stored in computer readable medium at least one computer program including computer readable code to perform the operations described with reference to method 600.

During stage S602, the telematics unit 120 receives a command from the user to perform an operation requiring playing back the data string. In one embodiment, S602 is implemented as stage S402 described above with reference to method 400 in FIG. 4.

During stage S604, the telematics unit 120 determines a user-volume value of the command received during stage S602. In one embodiment, processor 122 evaluates the audio signal generated by the command at one or more preset ranges of frequencies. The preset ranges of frequencies are stored, for example, in the in-vehicle memory 128. The processor 122 determines the signal strength at one or more preset ranges of frequencies and calculates a user-volume value from the determined signal strengths. A high signal strength or low signal strength may correlate to a command that is spoken loudly or softly, respectively, and is a function of the calibration of the speech recognition engine that analyzes the signal.

In one embodiment, the processor 122 evaluates a wave envelope that encompasses all the received frequencies for the audio signal, determines the maximum signal strength of the envelope, and calculates a user-volume value from the determined maximum signal strength. In another embodiment, the processor 122 evaluates a wave envelope that encompasses all the received frequencies for the audio signal, determines the average signal strength of the envelope, and calculates a user-volume value from the determined average signal strength.

In one embodiment, the processor 122 evaluates for the audio signal generated by the command for each word of the command and determines the user-volume value for each word of the command. In this case, the processor 122 averages the user-volume value of all the words of the command and uses that average as the user-volume.

When the speech generation algorithm generates an audio signal from the data string, the audio signal is operable to generate acoustic waves within a preset volume from one or more speakers 132. During stage S606, the telematics unit 120 correlates a volume value in the telematics unit 120 to the user-volume value determined during stage S604 before the prompt is announced to the user responsive to the command received during stage S602. The correlation between the volume value and the user-volume value is calibrated in the telematics unit 120.

In one embodiment, the user-volume value determined by the processor 122 is correlated to a programmable volume control on the one or more speakers 132. In this case, the processor 122 transmits instructions to adjust a voltage level of a processor in the one or more speakers 132.

In another embodiment, the user-volume value determined by the processor 122 is correlated to set voltage levels of the audio signal sent to the one or more speakers 132 from the speech recognition engine. In this case, the processor 122 transmits instructions to adjust a voltage level of the audio signals to the speech generation algorithm in a speech recognition engine.

During stage S608, the telematics unit 120 plays back the data string to the user with a volume that matches the volume of the received command. The speech generation algorithm in the speech recognition engine in the processor 122 converts the digital signals of the data string into the phonemes and pauses of the user utterance. The phonemes and pauses are sent from processor 122 out through one or more speakers 132 as acoustic waves of the virtual utterance. Acoustic waves are heard by the user as the user utterance including a plurality of words and a plurality of user pauses between the words. Since the volume value of the speech generation algorithm is correlated to the user-volume value, one or more speakers 132 generate acoustic waves at amplitudes that are equivalent to the acoustic waves of the command received during stage S602. In this manner, when the telematics unit 120 is being used in excessively windy or noisy background conditions, the volume of the virtual utterances increases by measuring the volume of the input speaker command at the microphone. Likewise, quiet background conditions and soft speakers initiate reduced volume virtual utterances.

Figure 7:
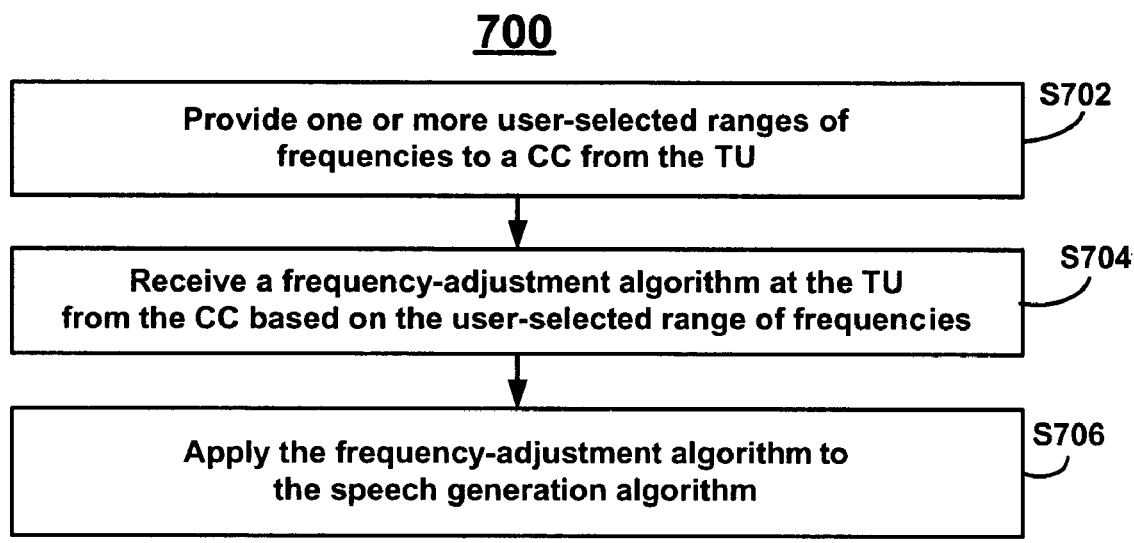
FIG. 7 illustrates a first embodiment of a method for setting frequency parameters in a speech generation algorithm in accordance with the present invention.

FIG. 7 illustrates a first embodiment of a method for setting frequency parameters in a speech generation algorithm in accordance with the present invention. In this first embodiment, the user informs a communication services advisor 178 at the call center 170 that the user does not hear one or more ranges of frequencies. The call center 170, the telematics unit 120, and the processor 122 have stored in computer readable medium at least one computer program including computer readable code to perform the operations described with reference to method 700.

During stage S702, the telematics unit 120 provides one or more user-selected ranges of frequencies to a call center (CC) 170. The user initiates a call to the call center 170 by, for example, a button push on a button in communication with the telematics unit 120. The button push establishes a connection between the telematics unit 120 and call center 170 via one or more wireless carrier systems 140, one or more communication networks 142, one or more land networks 144, one or more client, personal or user computers 150, one or more web-hosting portals 160. The user informs the communication services advisor 178 about the user's hearing limitations.

During stage S704, the telematics unit 120 receives a frequency-adjustment algorithm from the call center 170 based on the user-selected ranges of frequencies. The communication services advisor 178 generates a frequency-adjustment algorithm at the call center 170 and transmits the frequency-adjustment algorithm to the telematics unit 120. The frequency-adjustment algorithm is generated when the communication services advisor 178 inputs the range or ranges of frequency, which are inaudible by the user, into a table and applies a frequency-modifying algorithm to the table. In one embodiment, the communication services advisor 178 transmits the table to the telematics unit 120 and the processor 122 generates the frequency-adjustment algorithm.

During stage S706, the telematics unit 120 applies the frequency-adjustment algorithm to the speech generation algorithm, so that the speech generation algorithm is programmed to generate signals operable to produce acoustic waves at one or more speakers 132 having frequencies only within the user-selected range of frequencies. The modified speech generation algorithm is now the default speech generation algorithm. In this manner, if a user does not hear the high end of the frequency spectrum, the telematics unit 120 provides prompts that are in the low end of the frequency spectrum.

Figure 8:
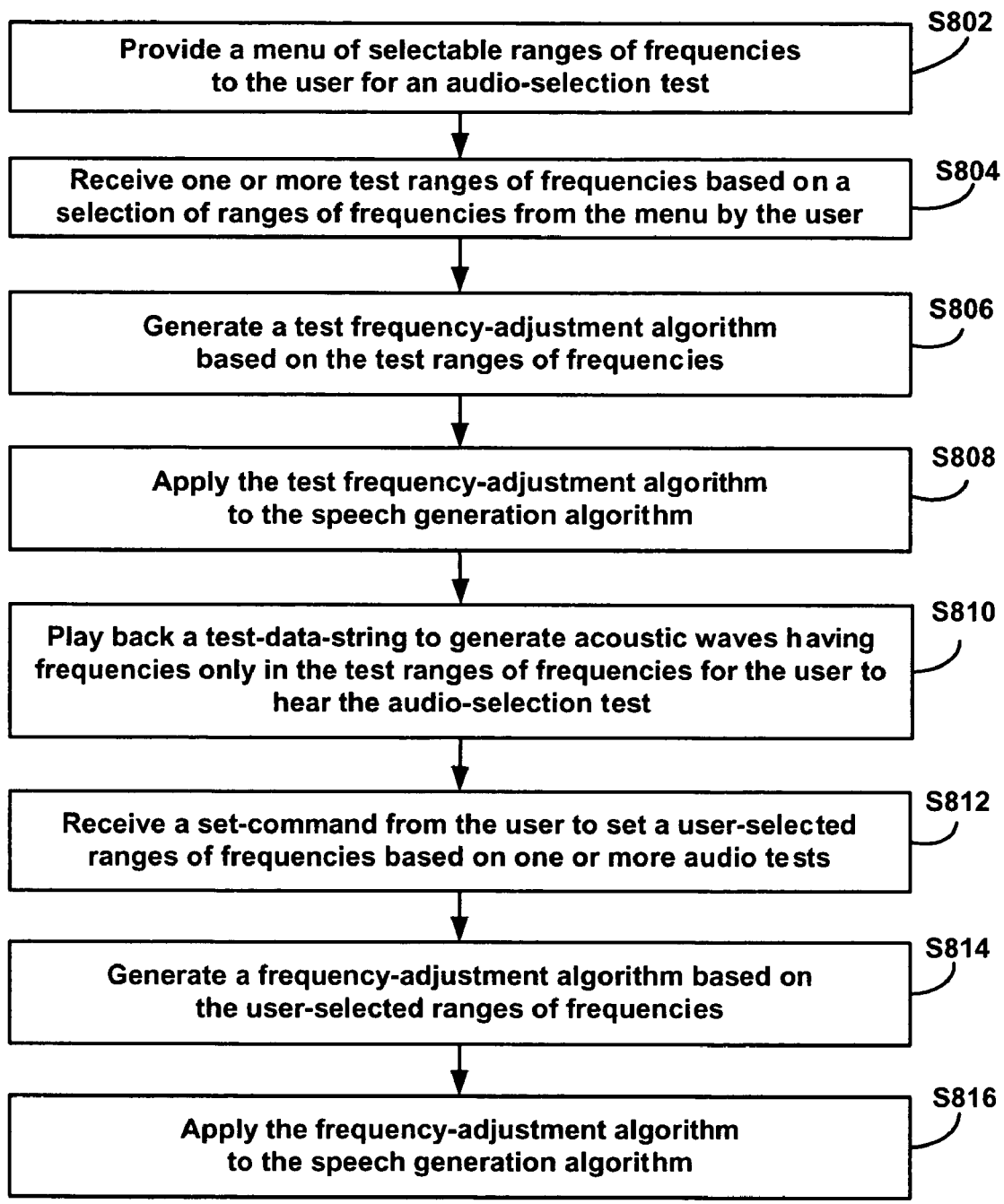
FIG. 8 illustrates a second embodiment of a method for setting frequency parameters in a speech generation algorithm in accordance with the present invention.

FIG. 8 illustrates a second embodiment of a method 800 for setting frequency parameters in a speech generation algorithm in accordance with the present invention. In this second embodiment, the user can listen to audio-selection tests at the telematics unit 120. The user can then select the acoustic ranges, which are most audible and/or pleasing to the user. The telematics unit 120, the processor 122, the in-vehicle memory 128, and the one or more speakers 132 have stored in computer readable medium at least one computer program including computer readable code to perform the operations described with reference to method 800.

During stage S802, the telematics unit 120 provides a menu of selectable ranges of frequencies to the user for an audio-selection test. The menu can be displayed on a display 136 in the MVCU 110. The menu can provide more than one range of frequencies that, in combination, cover the range of frequencies heard by humans. The frequency range is selected or deselected by touching the screen, or otherwise providing an input, on or near each range of frequencies. If the range is currently selected, touching the range deselects the range. If the range is not currently selected, touching the range, selects the range. Once a set of ranges is selected the user can touch an ENTER box in the displayed menu to indicate that the selected ranges of frequencies are the to be used in the audio-selection test.

In one embodiment, the display 136 is on a display in the embedded or in-vehicle portable communication device 134. In this embodiment, the telematics unit 120 communicates with the embedded or in-vehicle portable communication device 134 via a short-range wireless connection as described above with reference to FIG. 1.

During stage S804, the telematics unit 120 receives one or more test ranges of frequencies based on the user's selection of one or more ranges of frequencies from the menu. The processor 122 in the telematics unit 120 identifies the ranges of frequencies selected by the user during stage S802 as the test ranges of frequencies.

During stage S806, the telematics unit 120 generates a test frequency adjustment algorithm based on the test ranges of frequencies. The processor 120 generates a frequency-adjustment algorithm by entering the user selected test range or test ranges of frequency into a table and applying a frequency-modifying algorithm to the table. In one embodiment, the processor 120 generates a frequency-adjustment algorithm by entering the test range or test ranges of frequency, deselected by the user, into a table and applying a frequency-modifying algorithm to the table.

During stage S808, the telematics unit 120 applies the test frequency-adjustment algorithm to the speech generation algorithm. The telematics unit 120 applies the frequency-adjustment algorithm to the speech generation algorithm, so that the speech generation algorithm is temporarily programmed to generate signals operable to produce acoustic waves at one or more speakers 132 having frequencies only within the test range of frequencies when playing back the data string.

During stage S810, the telematics unit 120 plays back a test-data-string to generate acoustic waves having frequencies only in the test ranges of frequencies for the user to hear. The play back of the test-data-string is an audio-selection test. After the user has heard the audio-selection test, the user is provided with the same menu that was provided during stage S802. In one embodiment, the selected test ranges of frequencies used in the last audio-selection test are indicated on the menu for the user. In another embodiment, the user can see the menu with test ranges of frequencies during the audio-selection test. The test data string can be the numbers from zero (0) to nine (9). The user can repeat the flow of method 800 from stages S802 to S810 as many times as he or she desires. In this manner, the user can hear many different audio-selection tests.

During stage S812, the telematics unit 120 receives a set-command from the user. The set-command is operable to set user-selected ranges of frequencies based on hearing one or more audio-selection tests. After the user has determined which combination of test ranges of frequencies is the most audible and/or pleasing, the user selects the desired ranges of frequencies from the selectable test ranges of frequencies and presses a set button. In one embodiment, the set button is displayed on the menu with the desired ranges of frequencies. In one embodiment, the set button is a button in the telematics unit 120.

A set-command is generated in the telematics unit 120 by the pressing of the set button, or otherwise providing a set input. The set-command sets the user-selected ranges of frequencies as the default ranges of frequencies for all prompts generated in the telematics unit. The default ranges of frequencies are set until the user repeats stages S802-S812 of method 800. In one embodiment, after the telematics unit 120 receives the set-command, the telematics unit 120 repeats the test-data-string, to generate acoustic waves having frequencies only in the user-selected ranges of frequencies, and then prompts the user to confirm the set-command.

During stage S814, the telematics unit 120 generates a frequency-adjustment algorithm based on the user-selected ranges of frequencies. The processor 120 generates a frequency-adjustment algorithm by entering the user-selected ranges of frequency into a table and applying a frequency-modifying algorithm to the table. In one embodiment, the processor 120 generates a frequency-adjustment algorithm by entering the ranges of frequency that were not selected by the user into a table and applying a frequency-modifying algorithm to that table.

During stage S816, the telematics unit 120 applies the frequency-adjustment algorithm to the speech generation algorithm, so that the speech generation algorithm is programmed to generate acoustic waves having frequencies only within the user-selected range of frequencies when playing back the data string.

In one embodiment, the telematics unit 120 plays back data strings that mimic the pattern of a users speech at the volume level of the command that generated the prompt and in the ranges of frequencies that are audible to the user of the telematics unit. In another embodiment, the telematics unit 120 plays back data strings that mimic the pattern of a users speech in the ranges of frequencies that are audible to the user of the telematics unit.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of repeating a computer recognized string in a telematics unit in a vehicle, comprising:
receiving a user utterance at the telematics unit from a user, the user utterance including a plurality of segments including a user pause between each segment, each of the plurality of segments having a plurality of words and a plurality of user pauses between the words;
parsing the user utterance into a plurality of phonemes;
forming a data string, via a processor operatively associated with the telematics unit, in which each user pause is associated with a phoneme adjacent to the user pause by i) determining an average duration of each user pause between the plurality of words in each segment, ii) assigning a time duration for each of the user pauses based on the average duration determination of each user pause between the plurality of words, iii) determining an average duration of each user pause between each segment, iv) assigning a time duration for each of the user pauses based on the average duration determination of each user pause between each segment, v) associating each user pause with the phoneme adjacent to the user pause, and vi) concatenating each user pause and the associated phoneme, each user pause including its associated assigned time duration;
generating a virtual utterance corresponding to the data string; and
playing back the virtual utterance to the user.

2. The method of claim 1, wherein the user utterance includes a phone number.

3. The method of claim 1, wherein the phoneme adjacent to the user pause is one of a phoneme immediately preceding the user pause and a phoneme immediately following the user pause.

4. The method of claim 1, further comprising storing the data string in a memory in the telematics unit.

5. The method of claim 1, wherein receiving the user utterance at the telematics unit from the user comprises:
receiving the user utterance at a speech recognition engine operating in continuous recognition mode in the telematics unit.

6. The method of claim 5, wherein parsing the user utterance into the plurality of phonemes comprises:
recognizing phonemes for the plurality of words corresponding to the user utterance at the speech recognition engine.

7. The method of claim 1, further comprising:
receiving a command from the user to perform an operation requiring playing back the virtual utterance; and
retrieving the data string from a memory in the telematics unit for generation of the virtual utterance for play back.

8. The method of claim 1, wherein playing back the virtual utterance comprises:
receiving a command from the user to perform an operation requiring playing back the virtual utterance;
determining a user-volume value of the received command;
correlating a volume value in the telematics unit to the determined user-volume value; and
playing back the virtual utterance to the user with a volume that matches a volume of the received command.

9. The method of claim 1, wherein prior to playing back the virtual utterance to the user, the method further comprises:
setting frequency parameters in a speech generation algorithm in a speech recognition engine at the telematics unit.

10. The method of claim 9, wherein setting frequency parameters in the speech generation algorithm, comprises:
providing one or more user-selected ranges of frequencies to a call center from the telematics unit;
receiving a frequency-adjustment algorithm at the telematics unit from the call center based on the user-selected range of frequencies; and
applying the frequency-adjustment algorithm to the speech generation algorithm, wherein the speech generation algorithm is programmed to generate acoustic waves having frequencies only within the user-selected range of frequencies.

11. The method of claim 9, wherein setting frequency parameters in the speech generation algorithm, comprises:
providing a menu of selectable ranges of frequencies to the user for an audio-selection test;
receiving one or more test ranges of frequencies based on a selection of ranges of frequencies from the menu by the user;
generating a test frequency-adjustment algorithm based on the test ranges of frequencies;

applying the test frequency-adjustment algorithm to the speech generation algorithm;

playing back a test-virtual utterance to generate acoustic waves having frequencies only in the test ranges of frequencies for the user to hear the audio-selection test;

receiving a set-command from the user to set a user-selected ranges of frequencies based on one or more audio tests;

generating a frequency-adjustment algorithm based on the user-selected ranges of frequencies; and applying the frequency-adjustment algorithm to the speech generation algorithm, wherein the speech generation algorithm is programmed to generate acoustic waves having frequencies only within the user-selected range of frequencies when playing back the virtual utterance.

12. The method of claim 1 wherein the determining of the duration of each pause includes obtaining a time stamp from a GPS unit, the time stamp providing information related to a timing of each pause.

13. The method of claim 1 wherein the virtual utterance mimics patterns established by a rhythm, a timing, or combinations thereof of the user utterance.

14. A computer readable medium storing a computer program comprising:

computer readable code for receiving a user utterance at the telematics unit from a user, the user utterance including a plurality of segments including a user pause between each segment, each of the plurality of segments having a plurality of words and a plurality of user pauses between the words;

computer readable code for parsing the user utterance into a plurality of phonemes;

computer readable code for forming a data string in which each user pause is associated with a phoneme adjacent to the user pause, wherein the computer readable code for forming the data string includes i) computer readable code for determining an average duration of each pause between the plurality of words in each segment, ii) computer readable code for assigning a time duration for each of the user pauses based on the average duration determination of each user pause between the plurality of words, iii) computer readable code for determining an average duration of each user pause between each segment, iv) computer readable code for assigning a time duration for each of the user pauses based on the average duration determination of each user pause between each segment, v) computer readable code for associating each pause with the phoneme adjacent to the user pause, and vi) computer readable code for concatenating each user pause and the associated phoneme, each user pause including its associated assigned time duration;

computer readable code for generating a virtual utterance corresponding to the data string; and computer readable code for playing back the virtual utterance to the user.

15. The medium of claim 14, further comprising computer readable code for storing the data string in a memory in the telematics unit.

16. The medium of claim 14, wherein the computer readable code for parsing the user utterance into the plurality of phonemes comprises:

computer readable code for recognizing phonemes for the plurality of words corresponding to the user utterance at a speech recognition engine.

17. The medium of claim 14, further comprising:

computer readable code for receiving a command from the user to perform an operation requiring playing back the virtual utterance; and computer readable code for retrieving the data string from a memory in the telematics unit for generating the virtual utterance for play back.

18. The medium of claim 14, further comprising:

computer readable code for setting frequency parameters in a speech generation algorithm in a speech recognition engine at the telematics unit.

19. A system of repeating a computer recognized string in a telematics unit in a vehicle, the system comprising a memory, and a processing performing the steps of:

means for receiving a user utterance from a user, the user utterance including a plurality of segments including a user pause between each segment, each of the plurality of segments having a plurality of words and a plurality of user pauses between the words;

means for parsing the user utterance into a plurality of phonemes;

means for forming a data string in which each user pause is associated with a phoneme adjacent to the user pause, wherein the means for forming the data string includes i) means for determining an average duration of each pause between the plurality of words in each segment, ii) means for assigning a time duration for each of the user pauses based on the average duration determination of each user pause between the plurality of words, iii) means for determining an average duration of each user pause between each segment, iv) means for assigning a time duration for each of the user pauses based on the average duration determination of each user pause between each segment, v) means for associating each pause with the phoneme adjacent to the user pause, and vi) means for concatenating each user pause and the associated phoneme, each user pause including its associated assigned time duration;

means for generating a virtual utterance corresponding to the data string; and means for playing back the virtual utterance to the user.

20. The system of claim 19, further comprising means for setting frequency parameters in a speech generation algorithm in a speech recognition engine at the telematics unit.

* * * * *